Inventor:
Oscar Junggren,
by Albert Davis
His Attorney.

O. JUNGGREN.
BEARING.
APPLICATION FILED JUNE 11, 1918.

1,984,702.

Patented Nov. 12, 1918.
2 SHEETS—SHEET 2.

Inventor:
Oscar Junggren,
by Albert G. Davis
His Attorney

UNITED STATES PATENT OFFICE.

OSCAR JUNGGREN, OF SCHENECTADY, NEW YORK, ASSIGNOR TO GENERAL ELECTRIC COMPANY, A CORPORATION OF NEW YORK.

BEARING.

1,284,702.   Specification of Letters Patent.   Patented Nov. 12, 1918.

Application filed June 11, 1918. Serial No. 239,445.

*To all whom it may concern:*

Be it known that I, OSCAR JUNGGREN, a citizen of the United States, residing at Schenectady, county of Schenectady, State of New York, have invented certain new and useful Improvements in Bearings, of which the following is a specification.

The present invention relates to bearings such as are used, for example, in connection with elastic-fluid turbines to support the shaft and to hold the shaft and rotor against axial movement. The former are usually termed shaft bearings and the latter thrust bearings.

In the case of both shaft bearings and thrust bearings, it is important that the parts which rotate one on the other have as nearly as possible uniform contact over their entire surfaces so as to evenly distribute the load and wear, and also that the uniform contact be maintained, and the object of the present invention is to provide an improved structure and arrangement wherein both the shaft bearing and the thrust bearing are universally self-adjustable whereby they can adjust themselves to maintain this desired even distribution of the load.

In carrying out my invention I mount both the pillow block of the shaft bearing and the stationary members of the thrust bearing on a common support in such a manner that both may move together on the support to take a position corresponding to that of the shaft. By this means both will always be maintained in correct alinement with the shaft. It is already customary to make the outer surface of the pillow block of a shaft bearing of spherical form and support it on a spherical seat to provide universal adjustment for the shaft bearing, and according to one form of my invention I mount both the pillow block and the stationary members of the thrust bearing on such a spherical seat. This may be conveniently and advantageously accomplished by mounting the pillow block of the shaft bearing on a spherical seat as usual and attaching the stationary members of the thrust bearing to it. I then arrange the pillow block so that it can be adjusted axially to correctly position the thrust bearing.

For a consideration of what I believe to be novel and my invention, attention is directed to the accompanying specification and the claims appended thereto.

Figure 1:
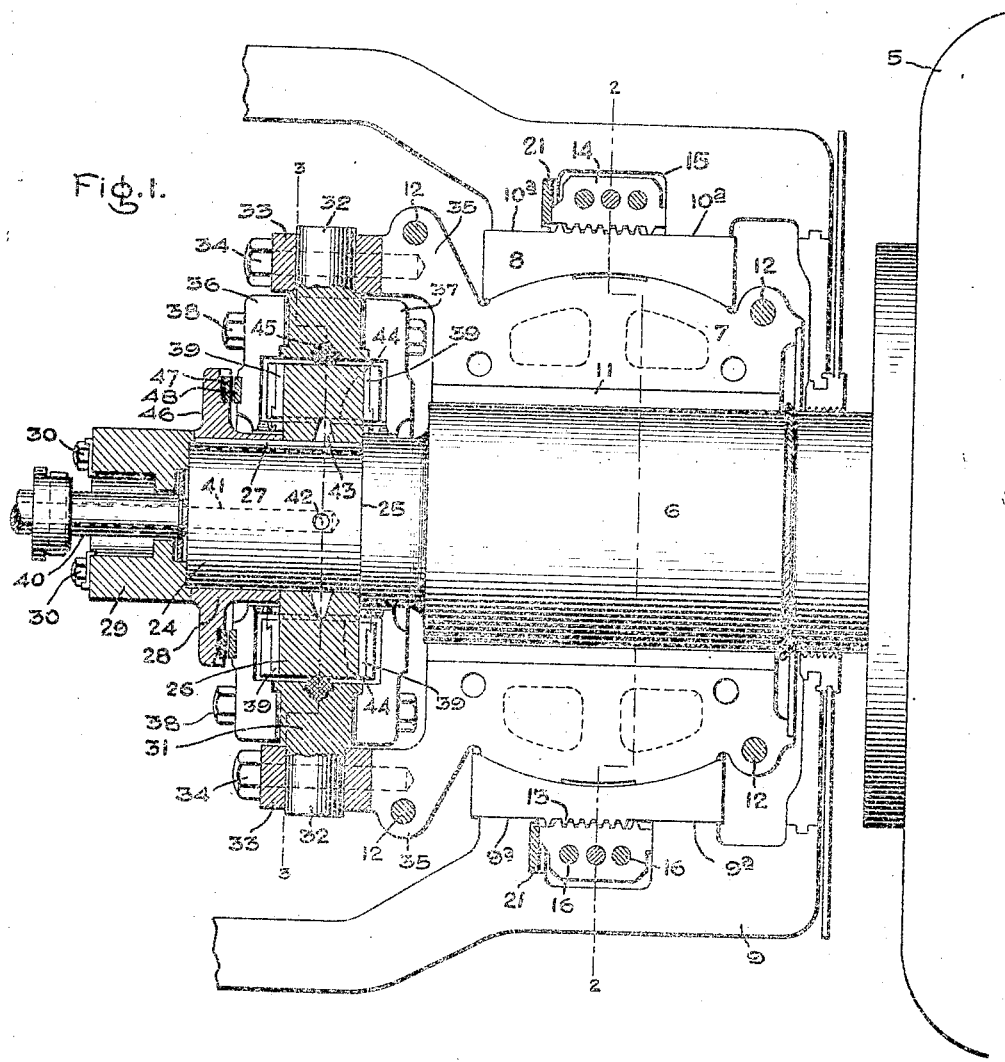
Figure 2:
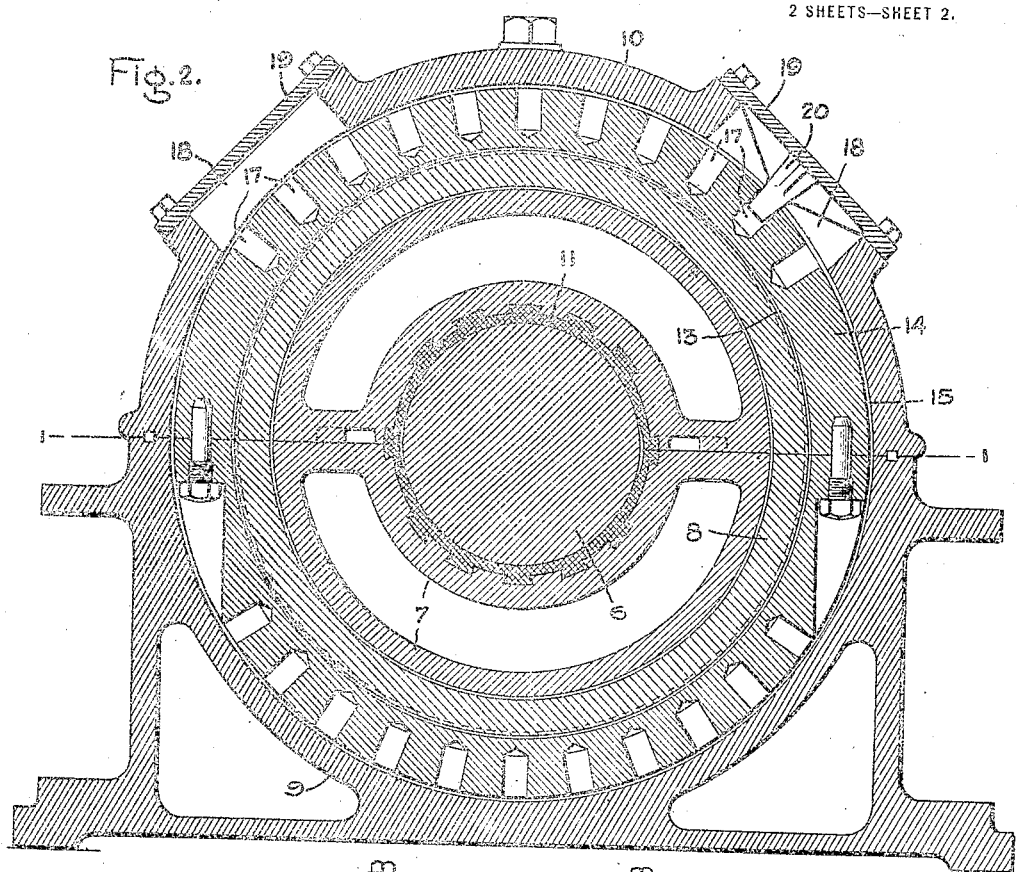
Figure 3:
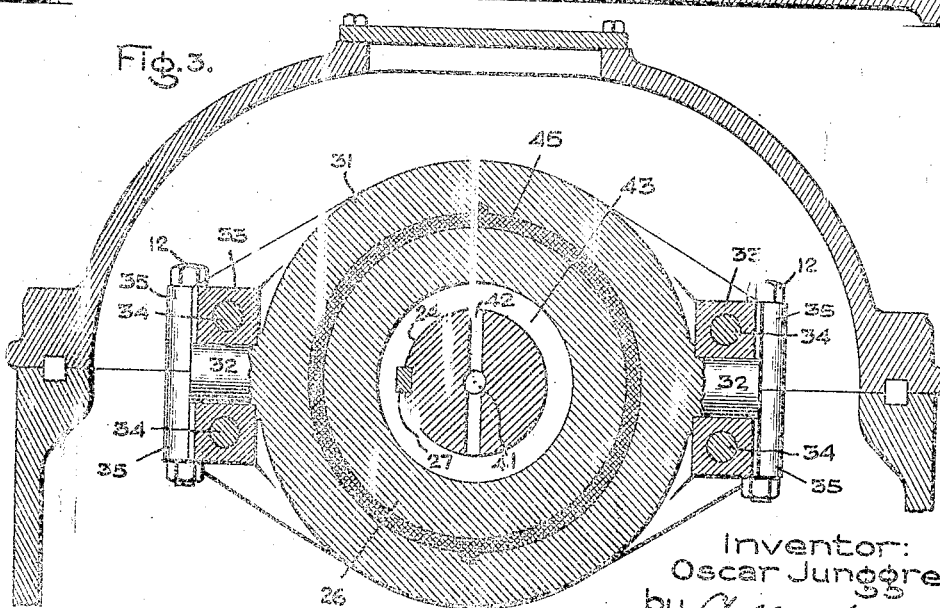

In the drawing, Figure 1 is a plan view of the lower half of a structure embodying my invention, the section being taken on line 1—1, Fig. 2; Fig. 2 is a section taken on line 2—2, Fig. 1, and Fig. 3 is a section taken on line 3—3, Fig. 1.

Referring to the drawing, 5 indicates the end of a machine casing, for example a turbine casing, and 6 a shaft which carries the rotor of the machine. The end of shaft 6 is supported in a shaft bearing of usual construction comprising a pillow block 7 having an outer spherical surface which rests on a spherical seat in a supporting ring 8 supported by a pedestal 9 which also forms the lower half of a casing or housing, the upper half being formed by a cover 10. The pillow block 7 and ring 8 are made in upper and lower halves. The halves of the pillow block 7 are provided with a bearing lining 11 and are connected together by bolts 12. The halves of ring 8 are held between the pillow block 7 on the one hand and pedestal 9 and cover 10 on the other hand. The outer surface of ring 8 is flat and is provided at its central portion with an annular screw thread 13 which meshes with an adjusting nut 14 located in an annular groove 15 in pedestal 9 and cover 10. On opposite sides of nut 14 the pedestal 9 and cover 10 have smooth, flat surfaces 9$^a$ and 10$^a$ which engage with the outer surface of the ring 8. The nut 14 is made in halves connected together by bolts 16, and in its outer surface is provided with holes 17 adapted to receive a suitable tool for turning it. In cover 10 are openings 18 through which access may be had to nut 14 and these openings are closed by caps 19, one of which has a projection 20 to engage in a hole 17 to lock nut 14 against movement. Nut 14 is located by a shim 21. It will be clear that by turning nut 14, ring 8 and bearing block 7 can be moved axially of shaft 6.

The outer end of shaft 6 is reduced in diameter, as indicated at 24, thus providing a shoulder 25, and engaging shoulder 25 is a thrust collar 26 suitably keyed to the shaft, as indicated at 27, and held against shoulder 25 by a spacing sleeve 28 which is held by a ring 29 fastened to the end of the shaft by bolts 30. Surrounding thrust collar 26 is a thrust ring 31 provided with trunnions 32 which are supported in blocks 33 fastened by bolts 34 to the ends of short arms 35 formed integral with the pillow block 7. Carried by thrust ring 31 are two annular thrust bearing plates 36 and 37. They are fastened one on each side of ring 31 by bolts 38 and have faces 39 of suitable bearing material, as babbitt, which are engaged by the thrust collar 26. Thrust plates 36 and 37 are preferably made in two halves, being split horizontally the same as are the shaft bearing parts. The thrust bearing is lubricated by oil which is forced by a suitable pump (not shown) through a pipe 40 into an axially extending hole 41 in shaft extension 24 from which it passes through radially extending openings 42 (Fig. 3) to an annular chamber 43 in thrust collar 26. From chamber 43 the lubricant passes through holes 44 to the thrust bearing surfaces. The thrust ring 31 is spaced slightly from thrust collar 26 and located centrally between the two is a narrow bearing ring 45 carried by thrust ring 31. This bearing ring 45 serves to make the lubricating passages for each thrust bearing surface separate and distinct. Without such a ring there is a tendency for the lubricant to follow the path of least resistance and flow to the bearing surfaces which at the time are not in contact and away from those which are, the latter surfaces being those where the lubricant is most needed.

Carried by the adjacent surfaces of the thrust bearing plate 36 and a flange 46 on sleeve 28 are two rings 47 and 48 having their adjacent surfaces but slightly spaced apart. The purpose of these rings is to form an indicating device. It will be noted that ring 47 revolves with the shaft and that ring 48 is stationary. If for any reason the shaft should shift sufficiently to bring ring 47 into engagement with ring 48, the rubbing of one on the other will make a noise which will attract attention to the machine.

The thrust bearing is adjusted axially to bring the parts carried by the shaft to correct axial position by turning the nut 14 which moves ring 8, pillow block 7 and the thrust rings 36 and 37 as a whole, the ring 8 sliding on the flat surfaces 9ᵃ and 10ᵃ. To turn the nut, the cover plate 19 which has the projection 20 is removed and a suitable bar placed in one of the holes 17.

With the above described arrangement it will be seen that for any position of the shaft 6 both the shaft bearing and the thrust bearing will be automatically maintained in correct alinement as both will be moved together on the spherical seat in ring 8. It will be understood of course that in no case will the shaft be far from true and that any movements are of small magnitude. Also due to the thrust ring being mounted on trunnion 32 it can adjust itself independently of the pillow block 7 in one plane. The arrangement also gives a very compact, rigid structure which is comparatively simple and cheap to build and in which the thrust rings are firmly held in any adjusted position.

In accordance with the provisions of the patent statutes, I have described the principle of operation of my invention, together with the apparatus which I now consider to represent the best embodiment thereof, but I desire to have it understood that the apparatus shown is only illustrative, and that the invention can be carried out by other means.

What I claim as new and desire to secure by Letters Patent of the United States, is,—

1. The combination with a shaft, of a supporting bearing block, a thrust bearing having its stationary portion connected to said block, and a common pedestal upon which both said bearing block and the stationary portion of said thrust bearing are adjustably supported.

2. The combination with a shaft, of a pedestal, means carried on said pedestal for supporting the shaft and holding it against axial movement and means for adjusting said first named means axially.

3. The combination with a shaft, of a pedestal, a ring supported on the pedestal and provided with a spherical seat, means carried in said spherical seat for supporting the shaft and holding it against axial movement, and means for adjusting the ring axially of the pedestal.

4. The combination with a shaft, of a shaft bearing therefor comprising a pillow block having a spherical outer surface and a support having a spherical seat, and a thrust bearing comprising a thrust collar fixed on the shaft, and a thrust plate which is carried by said pillow block, and means for adjusting said support axially.

5. The combination with a shaft, of a shaft bearing therefor comprising a pillow block having a spherical outer surface and a support having a spherical seat, a thrust bearing comprising a thrust collar fixed on the shaft, a ring surrounding it, and a thrust plate carried by said ring for engagement with the thrust collar; and means connecting said ring to said pillow block.

6. The combination with a shaft, of a shaft bearing therefor comprising a pillow block having a spherical outer surface and a support having a spherical seat, a thrust bearing comprising a thrust collar fixed on the shaft, a ring surrounding it, and a thrust plate carried by said ring for engagement with the thrust collar, and means pivotally connecting said ring to the said pillow block.

7. The combination with a shaft, of a shaft bearing therefor comprising a pillow block having a spherical outer surface, a ring having a spherical seat for said pillow block, a support for said ring, means for sliding said ring axially on its support, a thrust collar on the shaft, a thrust ring surrounding it and connected to the pillow block, and thrust plates carried by said thrust ring and engaging said thrust collar.

8. In combination, a shaft having a bearing section and a thrust collar, a member having a portion which engages the bearing section and another portion which engages the thrust collar to support the shaft and hold it against axial movement, a seat for said member, and means for moving said member axially.

9. In combination, a shaft having a bearing section and a thrust collar, a member having a portion which engages the bearing section and another portion which engages the thrust collar to support the shaft and hold it against axial movement, a second member having a spherical seat on which the first member rests, a support for said second member, and means for moving it axially on such support.

10. In combination, a shaft having a bearing section and a thrust collar, a member having a portion which engages the bearing section and another portion which engages the thrust collar to support the shaft and hold it against axial movement, a second member having a spherical seat on which the first member rests and a threaded portion, a support for said second member, and a nut which engages said threaded portion for moving both said members axially.

In witness whereof, I have hereunto set my hand this 10th day of June, 1918.

OSCAR JUNGGREN.